United States Patent [19]

Dowling et al.

[11] Patent Number: 4,974,777
[45] Date of Patent: Dec. 4, 1990

[54] MEANS AND METHODS FOR CONTROLLING THE DRYING OF WET GAS

[75] Inventors: Donald J. Dowling; Jackie C. Sims; Albert P. Richter, all of Houston, Tex.

[73] Assignee: Texaco Inc., White Plains, N.Y.

[21] Appl. No.: 412,026

[22] Filed: Sep. 25, 1989

[51] Int. Cl.$^5$ ................................................. B01F 3/02
[52] U.S. Cl. ..................................... 236/44 A; 55/20; 34/50; 236/78.0
[58] Field of Search ...................... 236/78, 44 A, 44 R; 34/50, 48; 62/93; 55/20; 324/668

[56] References Cited

U.S. PATENT DOCUMENTS

| | | | |
|---|---|---|---|
| 2,128,176 | 8/1938 | Bast et al. | 236/44 A |
| 4,701,188 | 10/1987 | Mims | 55/20 |
| 4,849,687 | 7/1989 | Sims et al. | 324/668 |

Primary Examiner—William E. Wayner
Attorney, Agent, or Firm—Robert A. Kulason; James J. O'Loughlin; Ronald G. Gillespie

[57] ABSTRACT

The control system and method of the present invention controls a heat treater receiving wet gas from a pipeline. The heat treater reduces the water content of the gas to provide dry gas to the pipeline. A sensor monitors the wet gas and provides a signal corresponding to the water content of the wet gas. A second sensor monitors the dry gas and provides a signal corresponding to the water content of the dry gas. A difference signal corresponding to the difference between the two water content signals. Apparatus controls the flow of fuel to the heat treater, so as to control the drying process, in accordance with the water content signal of the wet gas and the difference signal.

10 Claims, 1 Drawing Sheet

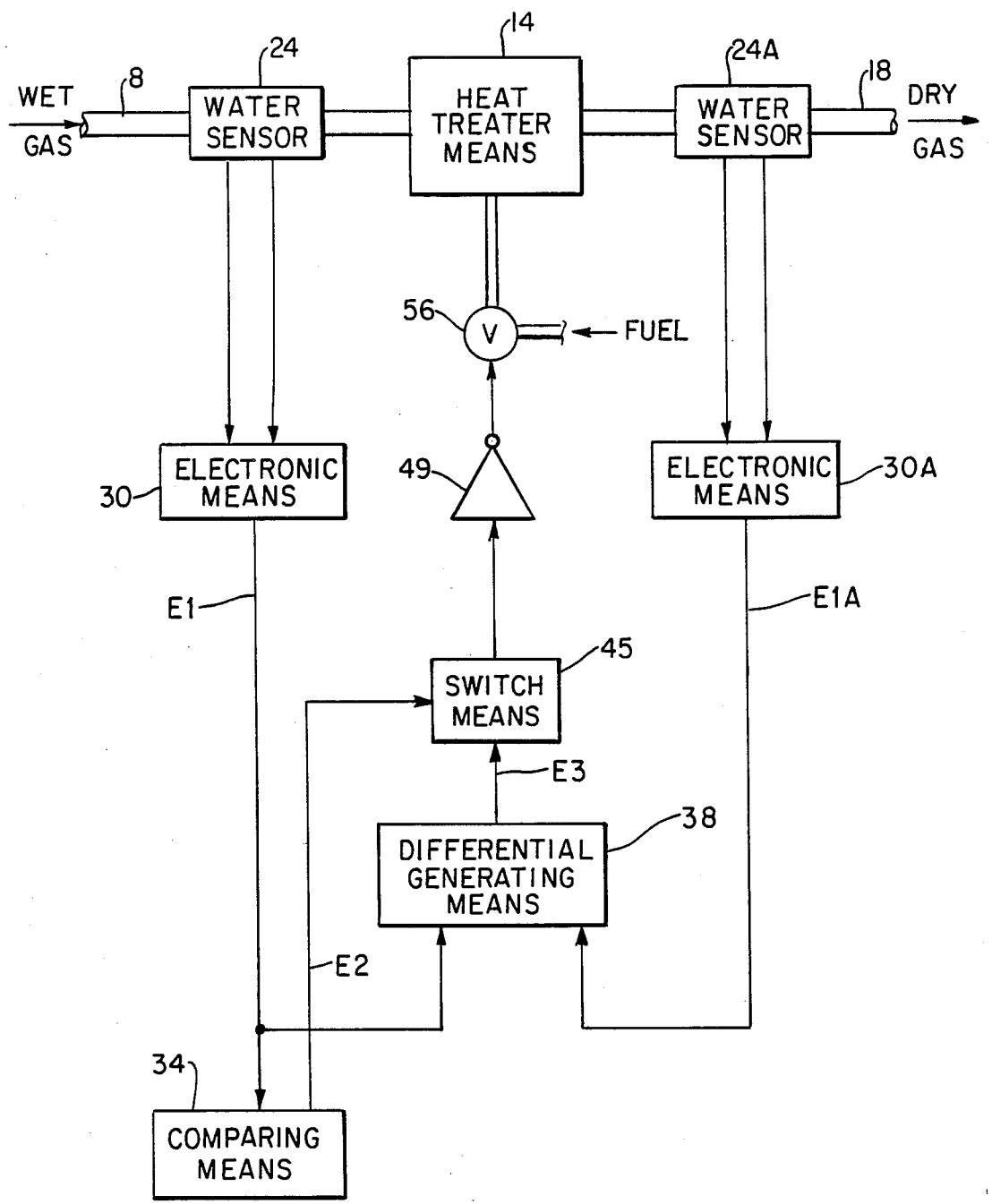

MEANS AND METHODS FOR CONTROLLING THE DRYING OF WET GAS

BACKGROUND OF THE INVENTION

Field of the Invention

The present invention rates to control system and methods in general and, more particularly, to systems and methods controlling the processing of gas.

SUMMARY OF THE INVENTION

The control system and method of the present invention controls a heat treater receiving wet gas from a pipeline. The heat treater reduces the water content of the gas to provide dry gas to the pipeline. A sensor monitors the wet gas and provides a signal corresponding to the water content of the wet gas. A second sensor monitors the dry gas and provides a signal corresponding to the water content of the dry gas. A difference signal corresponding to the difference between the two water content signals. Apparatus controls the flow of fuel to the heat treater, so as to control the drying process, in accordance with the water content signal of the wet gas and the difference signal.

The objects and advantages of the invention will appear more fully herein after from a consideration of the detailed description which follows, taken together with the accompanying drawing where one embodiment of the invention is illustrated by way of example. It is to be expressly understood, however, that the drawing is for illustration purposes only and is not to be construed as defining the limits of the invention.

DESCRIPTION OF THE DRAWING

The drawing is a simplified block diagram of a control system, constructed in accordance with the present invention, for controlling a heat treater reducing the water content of wet gas to provide dry gas.

DESCRIPTION OF THE INVENTION

Referring to the FIGURE there is shown a pipeline 8 carrying wet gas which is provided to a heat treater means 14 for the removal of moisture from the wet gas. Heat treater means 14 provides dry gas through a pipeline 18. In pipeline 8 there is a water sensor 24 which may be of the type disclosed and described in U.S. Pat. No. 4,849,687 and which is hereby incorporated hereinto Water cut sensor 24 provides a direct current signal, which is related to the dielectric constant of the wet gas, to electronic means 30, also part of the aforementioned U.S. patent. In essence, water sensor 24 is electronically connected by two lines and develops the direct current signal across the two lines. Elements 25 and 30 of the patent are used in electronic means 30 and signal C of the patent is used as the signal provided by mean 30. The dielectric constant signal is related to the dielectric constant of the wet gas in pipeline 8. Electronic means 30 utilizes the signal corresponding to the dielectric constant of the wet gas to provide an analog signal E1 whose amplitude corresponds to the water content of the wet gas.

Signal E1 is provided to comparing means 34 and to differential generating means 38. Comparing means 34 has an internal reference standard for the water content to which E1 is compared. Comparing means 34 provides a signal E2 at one logic level when signal E1 is greater than 1 volt and at another logic level when signal E1 is substantially equal to 1 volt. Signal E2 is provided to switch means 45.

Elements having the same numeric designation and an alpha suffix correspond to elements having the same numeric designation without an alpha suffix. Water sensor 24A senses the dielectric constant of the dry gas in pipeline 18 and provides a direct current signal related to the dielectric constant of the dry gas. Similarly, electronic means 30A provides an analog signal E1A corresponding to the water content of the dry gas to differential generating means 38. Again signal E1A will have a amplitude range of 1 volt to 10 volts.

Differential generating means 38 provides a signal E3 corresponding to the difference between signals E1 and E1A. Signal E3 is provided to switch means 45 which is controlled by signal E2. When signal E2 is at the one logic level, switch means 45 passes signal E3. When signal E2 is at the other logic level, switch means 45 blocks signal E3. An output of Switch means 45 is connected to an inverting power amplifier 49 which is adjustable so as to provide an "idle" signal as hereinafter explained. Amplifier 49 amplifies and inverts signal E3 when signal E3 is passed by switch means 45 and provides it to a control valve 56 receiving fuel. Amplifier 49 provides the "idle" signal to valve 56 when switch means blocks signal E3. Control valve 56 provides the fuel to heat treater means 14 in accordance with the signal from amplifier 49, thereby controlling the temperature of heat treater means 14. The "idle" signal, when used, causes heat treater means 14 to operate at a reduced state thereby minimizing the amount of fuel consumed when substantial drying of the wet gas is not necessary. Thus, heat treater means 14 will operate between an idle state and maximum drying state.

By way of explanation, the operation of the present invention will be described for two conditions. The first condition is when the wet gas is relatively dry in pipeline 8. In response to this condition, water sensor 24 and electronic means 30 combine to provide signal E1 at 1 volt. Comparing means 34 provides signal E2 at a low logic level since signal E1 is not greater than 1 volt. The low logic level of signal E2 causes switch means 45 to block the signal E3 from differential generating means 38. As a result power amplifier 49 provides a signal to valve 56 corresponding to an "idle" condition so that minimum fuel is provided to heat treater means 14 and thus, minimum drying occurs.

The second condition occurs when signal E1 is greater than 1 volt. Since signal E1 is greater than 1 volt, comparing means 34 now provides signal E2 at a high logic level causing switch means 45 to pass signal E3. Signal E3 of course, as noted earlier corresponds to the difference between signals E1 and E1A which corresponds to the difference between the water content of the wet gas in pipeline 8 and water content of the dry gas in pipeline 18. Signal E3 is amplified and inverted by power amplifier 49 and provided to valve 56. Valve 56 controls the quantity of fuel entering heat treater means 14 in accordance with the magnitude of the signal provided by amplifier 49, this in turn results in the drying accordingly of the wet gas entering heat treater means 14.

Thus it's obvious that if signal E1 was at the maximum level of ten volts then the maximum drying would occur.

The present invention has been described as a heat treating means utilizing fuel in which the control system controls the quantity of fuel so as to control the drying process. It would be obvious to one skilled in the art, that electrical means may be used to dry out the wet gas, in which case the signal from power amplifier 49 would be used to control the electrical apparatus used in the drying process.

What is claimed is:

1. A gas drying system comprising:

treatment means receiving wet gas for treating the wet gas in a manner so as to reduce the water content of the wet gas to provide dry gas in accordance with a control signal, first monitoring means for monitoring the wet gas and providing a first water content signal corresponding to the water content of the wet gas, second monitoring means for monitoring the dry gas and for providing a second water content signal corresponding to the water content of the dry gas, difference signal means connected to both monitoring means for providing a difference signal corresponding to the difference between both water content signals, and control signal means connected to both monitoring means and to the treatment means for providing the control signal to the treatment means in accordance with the difference signal and the first water content signal.

2. A system as described in claim 1 in which the control signal means includes:

comparing means connected to the first monitoring means for providing a signal when the first water content signal is greater than a predetermined amplitude at one logic level and providing the signal at another logic level when the first water content signal is substantially equal to the predetermined amplitude, switch means connected to the difference signal means for being controlled by the signal from the comparing means to pass or to block the difference signal from the difference signal means, and means connected to the switch means and to the treatment means for amplifying the signal passed by the switch means to provide the amplified signal as the control signal to the treatment means and for providing an "idle" signal as the control signal to the treatment means when the switch means does not pass the difference signal.

3. A system as described in claim 2 in which each monitoring means provides the water content signal as a signal having an amplitude varying from 1 volt to 10 volts in accordance with the water content of the gas it is monitoring.

4. A system as described in claim 3 in which the predetermined amplitude is 1 volt.

5. A system as described in claim 4 in which the treatment means includes:

heat treater means receiving the wet gas and providing the dry gas for converting fuel entering the heat treater means to heat so as to reduce the amount of water in the gas, and valve means connected to the heat treater means and receiving fuel for controlling the providing of the fuel to the heat treater means in accordance with the control signal so as to regulate the amount of heat used in the process.

6. A gas drying method comprising the steps of:

treating the wet gas in a manner so as to reduce the water content of the wet gas to provide dry gas in accordance with a control signal, monitoring the wet gas, providing a first water content signal corresponding to the water content of the wet gas, monitoring the dry gas, providing a second water content signal corresponding to the water content of the dry gas, providing a difference signal corresponding to the difference between both water content signals, and for providing the control signal in accordance with the difference signal and the first water content signal.

7. A method as described in claim 6 in which the control signal step includes:

comparing the first water content signal to a predetermined amplitude, providing a comparison signal when the first water content signal is greater than a predetermined amplitude at one logic level, providing the comparison signal at another logic level when the first water content signal is substantially equal to the predetermined amplitude, controlling switch means with the comparison signal to pass or to block the difference signal, and amplifying the signal passed by the switch means to provide the amplified signal as the control signal to the treatment means, providing an "idle" signal as the control signal when the switch means does not pass the difference signal.

8. A method as described in claim 7 in which each water content signal is provided as a signal having an amplitude varying from 1 volt to 10 volts in accordance with the water content of the gas being monitored.

9. A method as described in claim 8 in which the predetermined amplitude is 1 volt.

10. A method as described in claim 9 in which the treating step includes:

using heat treater means to treat the wet gas, providing of fuel to the heat treater means in accordance with the control signal so as to regulate the amount of heat used in the process.

* * * * *